(No Model.)

D. O. ADAMS.
CAMERA SHUTTER.

No. 327,980. Patented Oct. 13, 1885.

WITNESSES:
V. M. Hood.
Frank A. Jacob.

INVENTOR:
David O. Adams.
By H. P. Hood
Atty.

UNITED STATES PATENT OFFICE.

DAVID O. ADAMS, OF COLUMBUS, INDIANA.

CAMERA-SHUTTER.

SPECIFICATION forming part of Letters Patent No. 327,980, dated October 13, 1885.

Application filed January 5, 1885. Serial No. 152,112. (No model.)

*To all whom it may concern:*

Be it known that I, DAVID O. ADAMS, a citizen of the United States, residing at Columbus, in the county of Bartholomew and State of Indiana, have invented a new and useful Improvement in Camera-Shutters, of which the following is a specification.

My invention relates to an improved shutter for use in connection with a camera, said shutter being particularly adapted for use in taking instantaneous photographs.

The objects of my improvement are, first, to give to a pair of swinging slides, adapted to operate together, such a form as will enable them to cover or expose a large circular opening by a comparatively slight movement; second, to cause the exposure or uncovering of said opening to commence in the center and to proceed from the center outward, the opening at all times preserving a curvilinear outline; and, third, to operate said slides quickly without jar or disturbance of the camera.

The accompanying drawings illustrate my invention.

Figure 3:
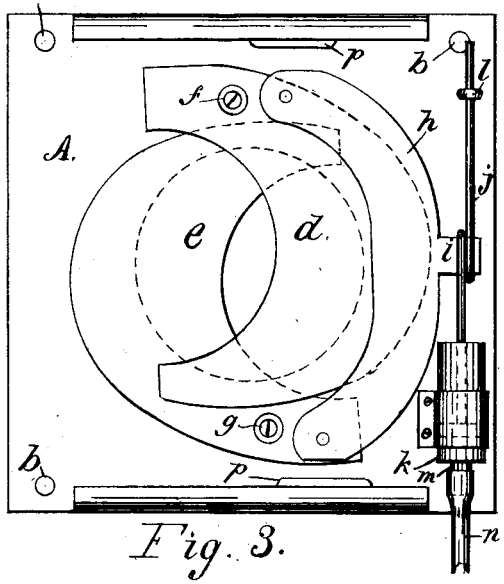
Figure 4:
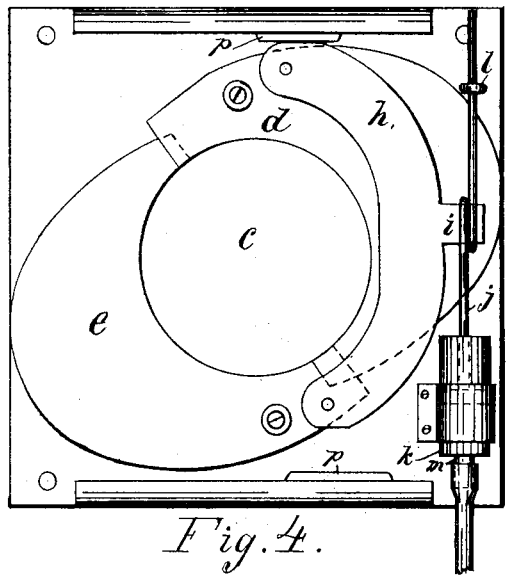
Figure 1:
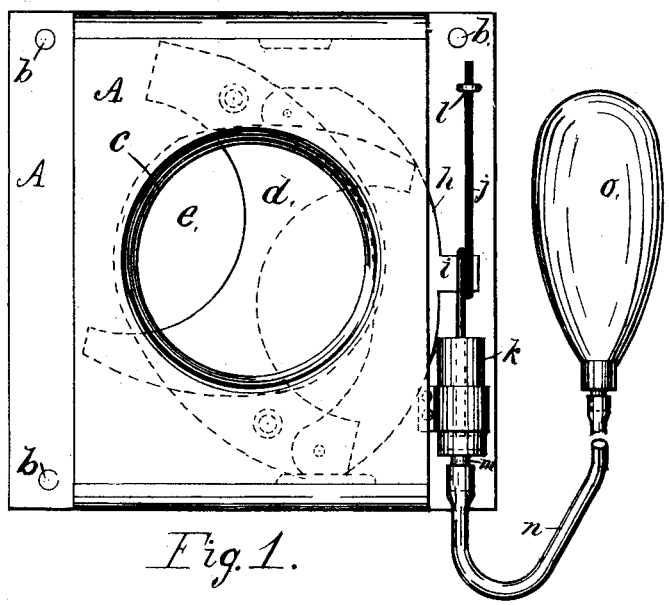
Figure 2:
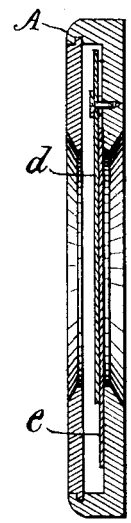

Figure 1 is a front elevation showing the slides closed. Fig. 2 is a vertical central section. Fig. 3 is an elevation having the front of the case removed, and showing the form of the slides and their position when first opening. Fig. 4 is a similar view showing the slides wide open.

A is a flat case adapted to be secured, by screws through the holes $b$, or by other suitable means, to the inside of the front of a camera-box, and having a central opening, $c$, opposite the camera-lens. To the inside of the back of case A are pivoted a pair of curved slides, $d$ and $e$. The shorter edges of said slides form, when the slides are laid together with their ends slightly overlapping, a complete circle of the same diameter as the opening $c$, as clearly shown in Fig. 4. The outer edges of the slides are also curved, and the slides are of such width that when closed together, as seen in Fig. 1, they completely cover the opening and overlap its edges sufficiently to prevent any light from passing through. The slides are pivoted to the case at $f$ and $g$, and are connected by a curved bar, $h$, which is pivoted at each end to the slides at equal distances from the pivots $f$ and $g$, so that as said bar is moved longitudinally the slides are thereby caused to simultaneously approach toward or recede from the center of the opening $c$.

For the purpose of quickly moving bar $h$, a short lateral arm, $i$, extends from said bar, and is embraced by a loop formed in a rod, $j$. To the lower end of said rod is secured a piston, which fits nicely, so as to slide freely in a cylinder, $k$, secured to the case A. The upper end of the rod is guided by a bearing, $l$, also secured to the case. The lower end of cylinder $k$ is closed, and is provided with a short tube, $m$, communicating with the interior of the cylinder. For the purpose of enabling the operator to operate the slides while standing at a distance from the camera, a rubber tube, $n$, is attached to tube $m$, and the piston is propelled from one end of the cylinder to the other by a sudden current of air forced through the tube, for which purpose a rubber bulb, $o$, may be used, or the lungs of the operator.

For the purpose of stopping the outward movement of the slides when the opening $c$ is fully uncovered, I secure stops $p$ $p$ to the inside of the case, which stops engage the outer edges of the slides. To avoid noise and jarring of the camera, said stops are preferably made of rubber or felt.

In operation, the operator having placed his prepared plate in the camera and arranged his subject, a sudden impulse of air along the tube $n$ forces the piston along the cylinder, thus moving bar $h$ longitudinally. Said bar being pivoted to the slides near their pivots, a short movement of the bar suffices to throw the slides wide open, at which point they may be held as long as desired by keeping up the pressure of air in the cylinder; or they may be instantly closed by drawing a current of air from the cylinder through the tube.

I claim as my invention—

1. In a camera-shutter, the flat case having a central opening, the curved slides pivoted to said case on opposite sides of and arranged to cover said opening, and the curved bar pivoted to said slides, all combined and arranged to co-operate as and for the purpose specified.

2. In a camera-shutter, the combination, with the case, the curved slides pivoted thereto, and the bar pivoted to said slides, in the manner shown and described, and having the arm $i$, of the pneumatic cylinder, the piston and piston-rod moving in said cylinder and connected with said bar, substantially as and for the purpose specified.

DAVID O. ADAMS.

Witnesses:
WALTER J. QUICK,
JOHN A. KENNY.